(No Model.)

F. F. RAYMOND, 2d.
NAIL MAKING MACHINE.

No. 325,272.  Patented Sept. 1, 1885.

WITNESSES.
J. M. Dolan.
Fred. B. Dolan.

INVENTOR.
F. F. Raymond (No Model.) F. F. RAYMOND, 2d. 6 Sheets—Sheet 4.
NAIL MAKING MACHINE.

No. 325,272. Patented Sept. 1, 1885.

WITNESSES. INVENTOR (No Model.) 6 Sheets—Sheet 5.

F. F. RAYMOND, 2d.
NAIL MAKING MACHINE.

No. 325,272. Patented Sept. 1, 1885.

WITNESSES
J. M. Dolan
Fred. B. Dolan

INVENTOR
F. F. Raymond 2d

UNITED STATES PATENT OFFICE.

FREEBORN F. RAYMOND, 2D, OF NEWTON, MASSACHUSETTS.

NAIL-MAKING MACHINE.

SPECIFICATION forming part of Letters Patent No. 325,272, dated September 1, 1885.

Application filed April 25, 1885. (No model.)

*To all whom it may concern:*

Be it known that I, FREEBORN F. RAYMOND, 2d, of Newton, in the county of Middlesex and State of Massachusetts, have invented a new and useful Improvement in Nail-Making Machines, of which the following is a full, clear, and exact description, reference being had to the accompanying drawings, forming a part of this specification, in explaining its nature.

The invention is an improvement upon that described in my application for Letters Patent of the United States filed January 13, 1885, Serial No. 152,725; and it comprises the use, in connection with the pointing and severing mechanism therein described, of additional cutters or burrs for forming notches or serrations in the wire from which the nails are made.

It is desirable that nails made from wire shall either be corrugated or shall have indentations, notches, cross-grooves, or recesses formed therein, by which the holding-power of the nails in the heel may be considerably increased, and when such nails are to be used for what is known as "blind-nailing" it is desirable that there be formed near the upper ends or heads of the nails a notch or groove which shall be embedded within the leather of the top lift when the same shall have been spanked thereon.

Figure 1:
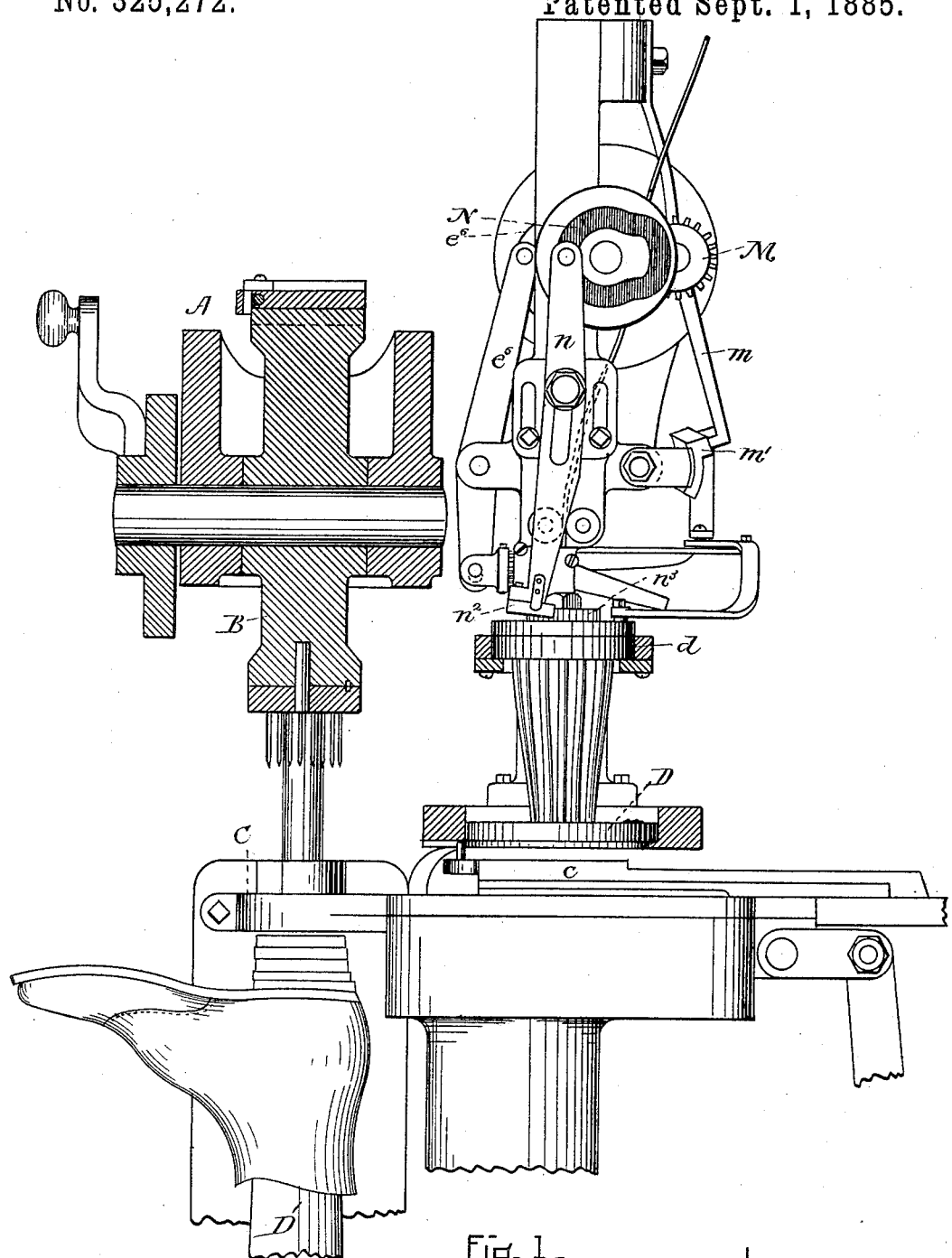
Figure 2:
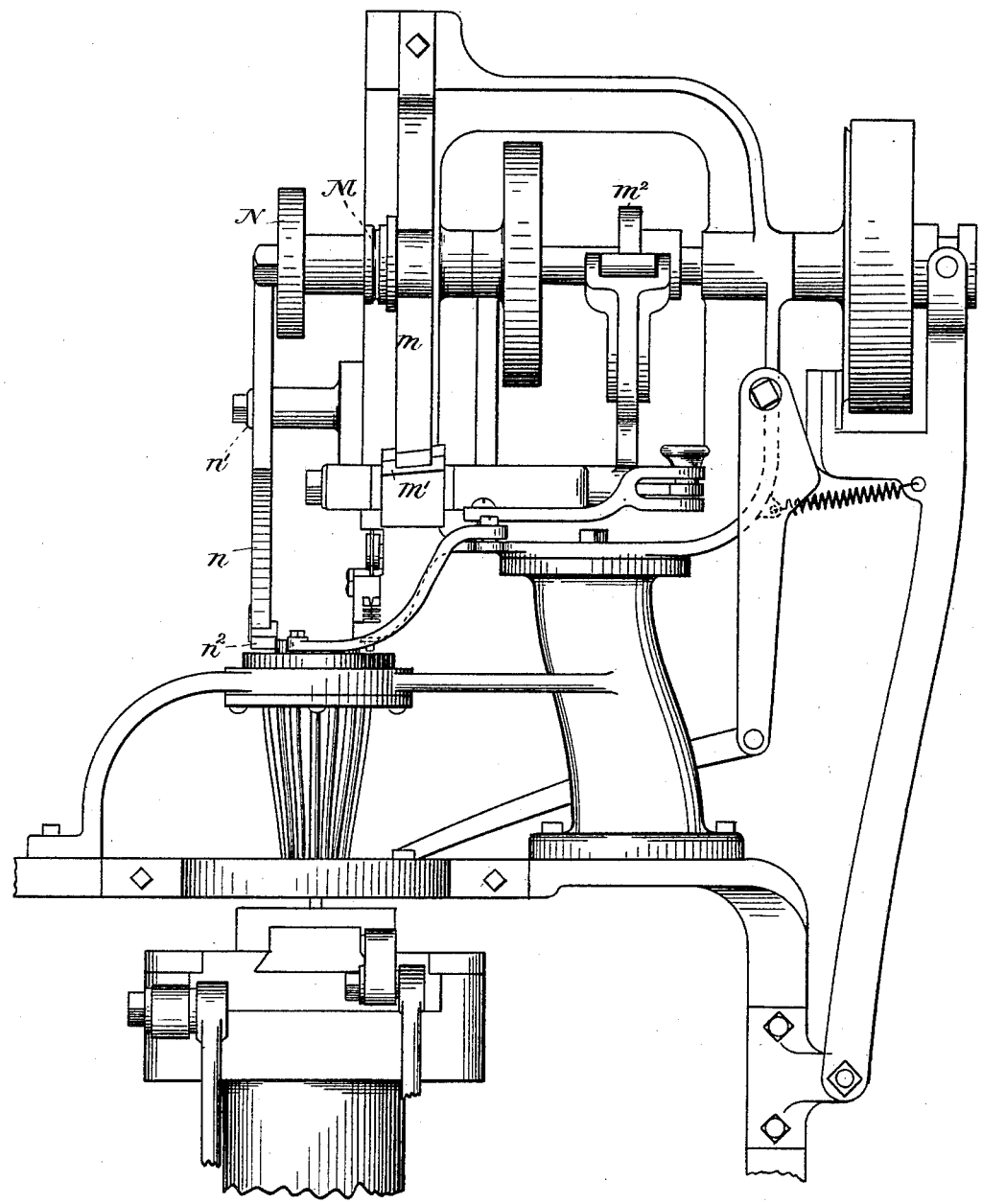
Figure 3:
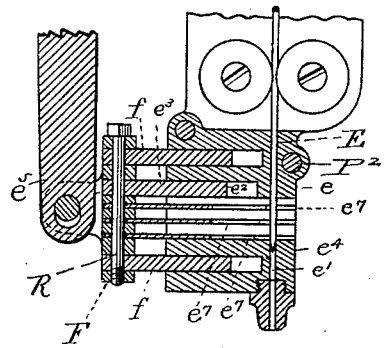
Figure 4:
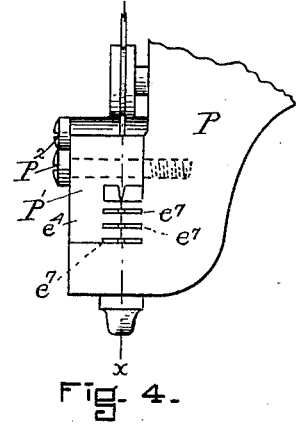
Figure 5:
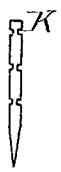
Figure 6:
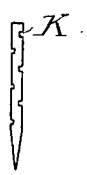
Figure 7:
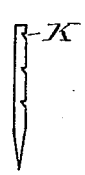
Figure 8:
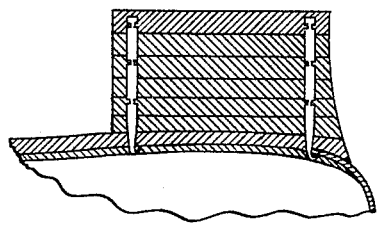
Figures 7, 10:
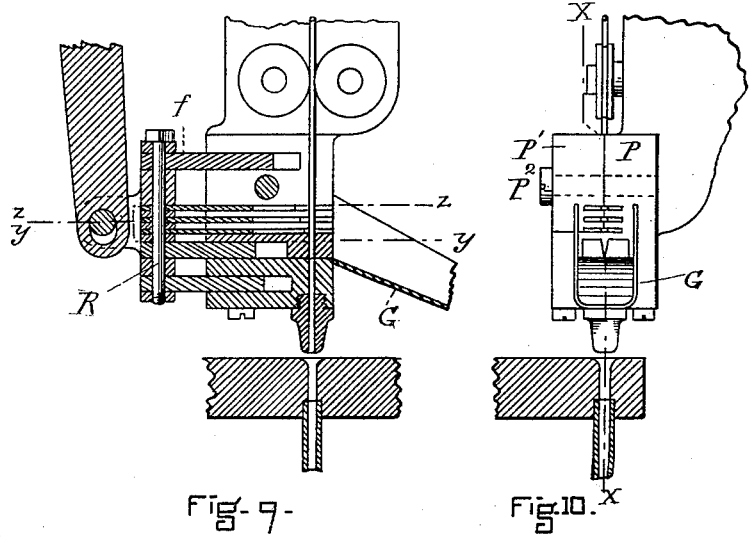
Figure 11:
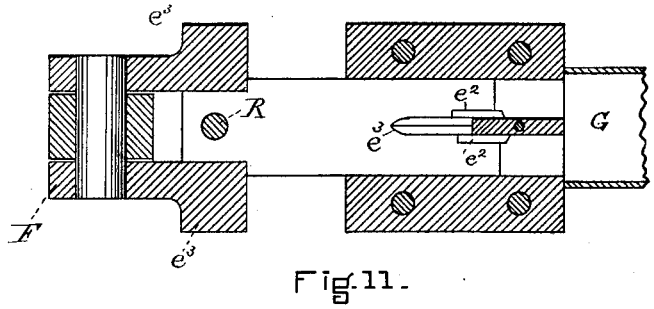
Figure 12:
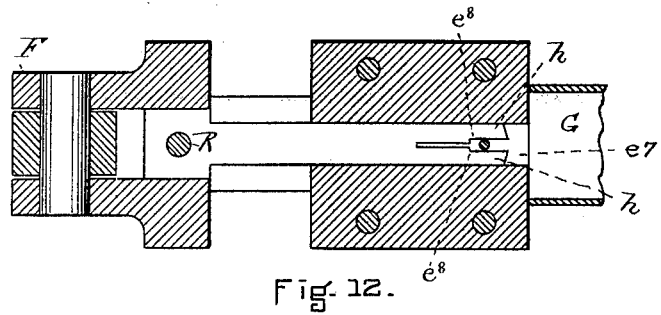
Figure 13:
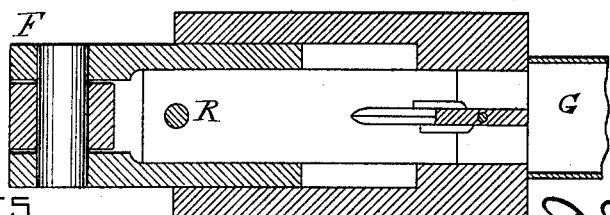
Figures 14, 15:
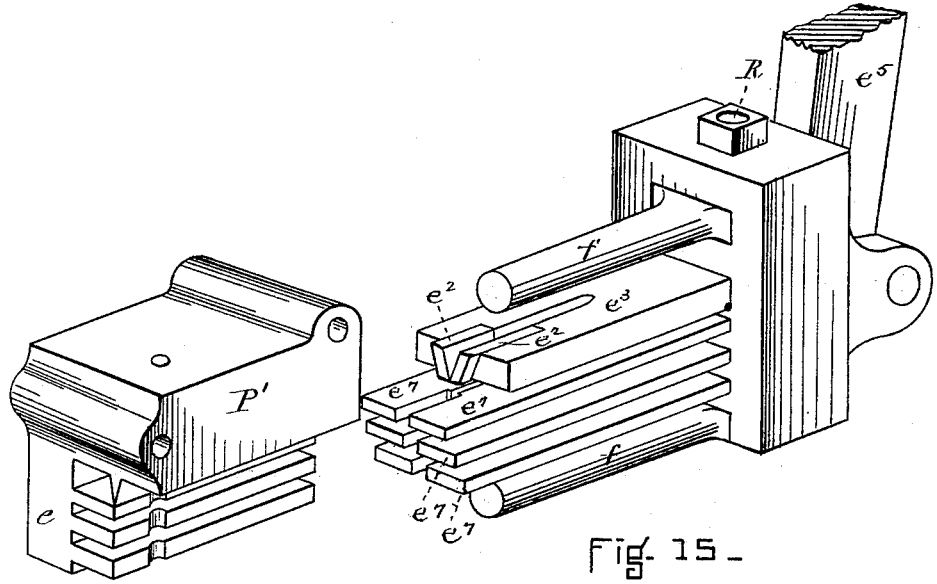
Figure 16:
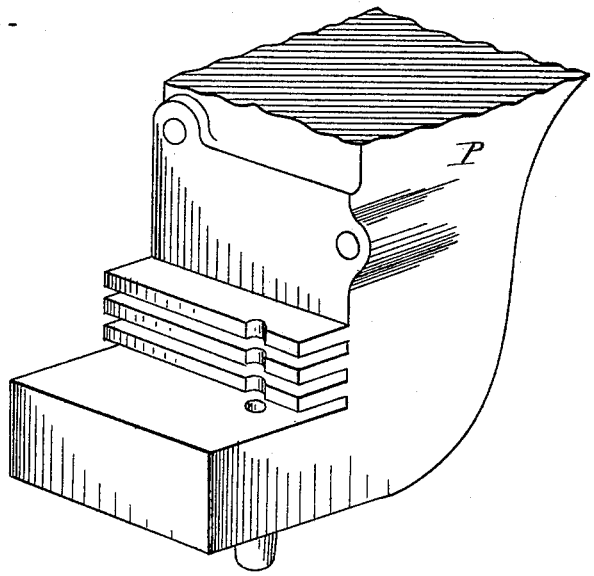
Figure 17:
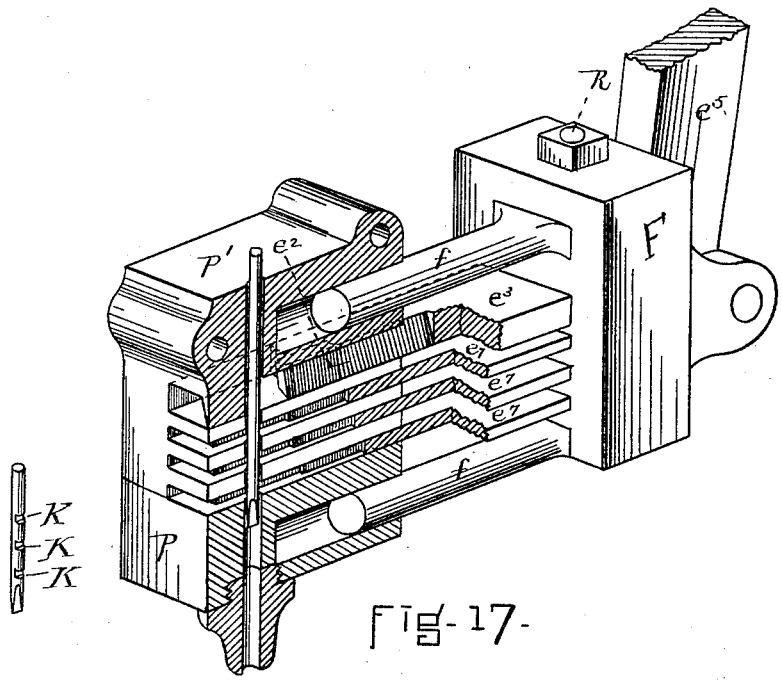

Referring to the drawings, Figure 1 represents my invention as forming a part of a heel nailing or attaching machine, and it illustrates, part in section and part in side elevation, the upper part thereof. Fig. 2 is a rear elevation thereof. Fig. 3 represents in vertical section, enlarged, the pointing, severing, and wire cutting or notching devices upon the line $x\ x$ of Fig. 4. Fig. 4 is a front elevation representing the arrangement of the notching or grooving devices below the pointing or severing cutters or knives. Figs. 5, 6, and 7 represent in end elevation nails having beveled points and notches formed therein, showing some of the arrangements and forms of the notches, grooves, or serrations made by the notching, serrating, or burring cutter. Fig. 8 shows in vertical section a heel-blank attached by the form of nails shown in Fig. 5. Fig. 9 shows in vertical section, upon the line $x\ x$ of Fig. 10, different arrangements of the notching or serrating cutters, hereinafter referred to, and also a portion of the nail-distributer beneath the throat of the device. Fig. 10 is a view in end elevation of this portion of the nail-making device, also showing in section a portion of the nail-distributer. Fig. 11 is a horizontal section, enlarged, upon the line $y\ y$ of Fig. 9. Fig. 12 is a horizontal section, enlarged, upon the line $z\ z$ of Fig. 9. Fig. 13 represents in horizontal section a modified form of construction, hereinafter especially referred to. Fig. 14 is a view in perspective of one of the blocks containing the throat of the machine, and providing ways for the cutters, hereinafter described. Fig. 15 is a perspective view representing the form and arrangement of the cutters and manner of supporting and operating the same. Fig. 16 is a perspective view of another of the blocks containing a portion of the throat and cutter-guideways, to which reference will hereinafter be made. Fig. 17 is a vertical central section and perspective of the blocks and cutters together, showing their relation to each other and to the wire upon which they operate.

The invention is represented in the drawings as applied to or used in connection with or forming a part of a heel-attaching machine.

A represents the cross-head of the heel-nailing machine, which is reciprocated by mechanism described in the Henderson patent, No. 259,687, dated June 20, 1882.

B is the revolving head, which supports or carries the awls, drivers, and top-lift holder and spanker.

C is the templet, which is arranged to be moved automatically into and out of operative position. *c* is the nail-carrier, which transfers the nails from the nail-holder D to a position to be driven, and which is also moved automatically. I prefer to use for moving these plates the devices described in Patent No. 290,109, dated December 11, 1883.

D′ is the jack.

Although the invention is shown in connection with a heel attaching or nailing machine, I do not intend to confine myself to its use in connection therewith; but when used in connection with the heel attaching or nailing machine it is necessary to employ a distributer, *d*, connected with the nail-holder D, which is like that described in my pending application, dated July 17, 1884, Serial No. 137,980.

The wire from which the nails are formed is fed by the feed-rolls, one only of which is shown, or by any other suitable feeding device, through the passage to the feedway E, which extends through the blocks e into the throat e'. There is arranged to cross this feedway the V-shaped cutters $e^2$, which sever the nails from the wire and form the points thereof. These cutters $e^2$ are arranged in relation to each other to sever or cut from the sides of the wire portions thereof to form a sharp tapering point, and at the same time to sever a previously-pointed section from the wire, and they are like or similar to those described in my application for Letters Patent filed January 13, 1885, Serial No. 152,725. These cutters are carried by the block $e^3$, which is reciprocated in suitable ways in the holding-blocks $e^4$ by means of the lever $e^5$, operated by the cam $e^6$. There is also arranged to cross the feedway horizontally one or more horizontal recesses, $e^7$, in addition to that in which the pointing and severing cutters operate, within which there are arranged to be reciprocated the cutters $e^8$, which operate to cut serrations or notches in the wire. These passages or recesses and cutters may be above the pointing-cutters, as represented in Figs. 9 and 10, or below them, as shown in Figs. 3 and 4, and the passages or recesses extend across the blocks e from side to side, and the cutters are supported at their ends by the block F, to which the block carrying the pointing-cutters is attached. The cross recesses or passages extend to the end of the blocks e, and provide means by which the waste removed from the wire escapes. There is arranged a chute, G, below the end of these passages and connected with or fastened to the blocks e, for receiving the waste and conducting it away.

The notching or serrating cutters, preferably, are formed as represented in Fig. 12—that is, with the portions h, which do not extend into the feedway, but which form a portion of the wall thereof before the cutter is reciprocated, and the cutters proper, $e^8$, which are arranged when reciprocated to extend into the feedway the distance that it is desired the notch or serration shall be formed in the wire. Of course as many of these notches or serrations may be formed as may be desirable or as may be desired; and I may make but one, or there may be three, four, five, or even more, if desired, and they may be arranged upon one or both sides of the wire.

The construction which I prefer to employ is that represented in Figs. 3 and 4, where the notching-cutters are below the pointing-cutters, because by this construction I am able to accurately locate or place a notch, K, in relation to the upper end or head of the nail. This notch it is especially desirable to locate in nails intended for blind-nailing, because it is of importance that the nails shall have a groove or notch in that portion which is to receive and hold the top lift, and by arranging one of the notching-cutters below the nail-pointing cutters and severing-cutters a notch or serration is always formed at a uniform distance from the end or head of the nail, regardless of the length of the nail.

I prefer that the cutters be arranged one in advance of the other in vertical line, and also in advance of the pointing-cutters, so that the operation of cutting the notches and of pointing and severing may be successive rather than simultaneous, as that renders less force or power necessary in moving the cutters.

The feed-roll M shown is carried by the spring-arm m, which is moved at given intervals into and out of operative position by means of the wedge arm or block m', oscillated by the cam $m^2$, and the connecting mechanism described in the patent dated July 1, 1884, No. 301,464.

The distributer is revolved by the cam N, the lever n, pivoted at n', and the pawl $n^2$, which engages with the ratchet-wheel $n^3$. In operation the wire is fed from the reel by the feed-rolls through the feedway to a position to be pointed by the pointing-cutters, and upon a reciprocation of the machine the point is formed, and if the arrangement of notching or serrating cutters shown in Figs. 9 and 10 be used the wire is notched or serrated. The next movement of the feed-rolls advances the wire a distance sufficient to form a nail, and upon the next reciprocation of the cutters the scores, grooves, or notches are formed in the nail, if they were not previously formed, and the nail is severed.

The cutter-holder block F has the guide pins or projections f, which enter holes in the block e, which serve to steady and guide the block as it is reciprocated. In Fig. 13 I have shown, in lieu of the guide-pins, the knife-holding block F made longer and the block e made wider, and provided with a recess for receiving the cutter-holding block, so that the cutter-holding block reciprocates in a recess formed in the block e. In order that the recesses in which the cutters are reciprocated may be easily formed, I have made the block e in the two parts P P', (see Figs. 4, 10, 14, 16, and 17,) the part P being removable, and being fastened to the other part by bolts $P^2$. Each of these parts contains one-half of each recess or space in which the cutters are caused to reciprocate.

I do not, however, confine myself to the especial form of construction shown in these figures, as there are many other ways of shaping the blocks to support the cutting devices, and there are also other means of supporting the cutters and operating them.

Of course I may use, in lieu of cutters which remove sections of the side of the wire or nails, burrs for forming, by grinding action, spaces or recesses therein; or the surface of the nail or wire may be simply indented without removing any portion thereof by being displaced, in which case, in lieu of the cutters or burrs, a blunt indenting device similar in form to the notching-cutters, with the exception that it is unprovided with a cutting-edge, is used.

The cutters are held to their supporting-block by the bolt R. The operation of feeding, scoring, or severing them continues in a regular and uniform manner.

Of course the shape of the scores, serrations, or notches in the wire or nail may be varied to any reasonable extent, and they may be as shallow or as deep as may be desired.

The nails, as they are cut, are either dropped from the throat into the holes in the distributer or are pushed therefrom by the wire as it is fed forward; but in this respect the invention does not differ from that described in my said application filed.

Having thus fully described my invention, I claim and desire to secure by Letters Patent of the United States—

1. In a nail-making machine, in combination with the feedway, one or more movable cutters for forming notches, serrations, or grooves in the body of the nail, all substantially as and for the purposes described.

2. In a nail-making machine, in combination with the movable pointing-cutters, one or more notching or serrating or grooving cutters adapted to be moved across the feedway to form notches or serrations or indentations in the shank of the nail, all substantially as and for the purposes described.

3. The combination of the feedway of the machine, the cutter passage or passages extending across the same, and the movable cutter or cutters for forming notches, grooves, serrations, or indentations in the shank of the nail, all substantially as and for the purposes described.

4. The combination of the throat of the machine, the movable cutters for severing the nail, and a movable notching or grooving cutter arranged below the severing-cutter, for the purpose of forming a notch or recess in the shank of the nail at a given distance from the head thereof, regardless of its length, all substantially as and for the purposes described.

FREEBORN F. RAYMOND, 2D.

Witnesses:
BOWDOIN S. PARKER,
FRED. B. DOLAN.